United States Patent [19]

Steingraber

[11] Patent Number: 5,080,041
[45] Date of Patent: Jan. 14, 1992

[54] PRE-CURVED MILK TUBE

[75] Inventor: Gary C. Steingraber, Madison, Wis.

[73] Assignee: DEC International, Inc., Madison, Wis.

[21] Appl. No.: 575,063

[22] Filed: Aug. 30, 1990

[51] Int. Cl.[5] ............................................. A01J 5/04
[52] U.S. Cl. .................................................. 119/14.55
[58] Field of Search ............... 119/14.47, 14.51, 14.54, 119/14.55

[56] References Cited

U.S. PATENT DOCUMENTS

| | | |
|---|---|---|
| 2,518,589 | 8/1950 | Anderson . |
| 3,150,637 | 9/1964 | Fosnes ......................... 119/14.54 |
| 3,611,993 | 10/1971 | Norton ......................... 119/14.47 X |
| 4,196,696 | 4/1980 | Olander ......................... 119/14.51 |
| 4,253,419 | 3/1981 | Yang ......................... 119/14.54 |
| 4,324,201 | 4/1982 | Larson ......................... 119/14.51 |
| 4,537,152 | 8/1985 | Thompson ......................... 119/14.54 |
| 4,745,881 | 5/1988 | Larson ......................... 119/14.51 |
| 4,756,275 | 7/1988 | Larson ......................... 119/14.51 X |
| 4,869,205 | 9/1989 | Larson ......................... 119/14.51 |

FOREIGN PATENT DOCUMENTS 2053648  2/1981  United Kingdom ............ 119/14.51

Primary Examiner—Robert P. Swiatek
Attorney, Agent, or Firm—Andrus, Sceales, Starke & Sawall

[57] ABSTRACT

A flexible formed pre-curved milk tube (50) extends outwardly from a milking claw inlet (26) and naturally curves upwardly to a teat cup (20), minimizing stress otherwise occurring in a straight milking tube (40), such that the pre-curved tube (50) maintains increased clearance (52) between the pre-curved tube and the claw inlet opening (44) to maximize the inner cross sectional area of the tube and create less restriction to flow as compared to the reduced clearance (46) caused by stressing a straight tube (40) to a curved connected condition. Rotation of the pre-curved tube (50) from the unstressed position to a downward non-milking position provides a greater range of motion than a straight tube (40), which greater range of motion provides a better shut-off seal.

17 Claims, 3 Drawing Sheets

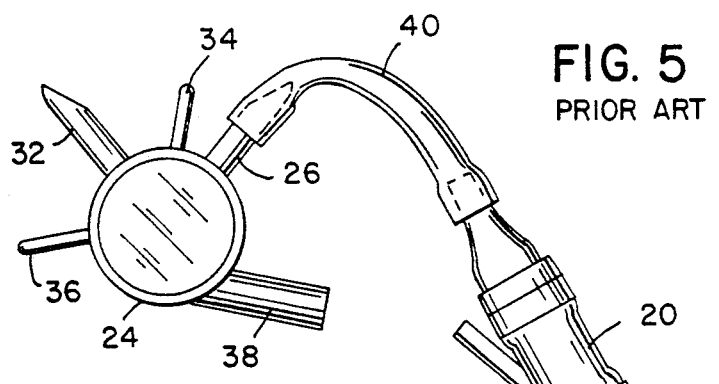
FIG. 5
PRIOR ART
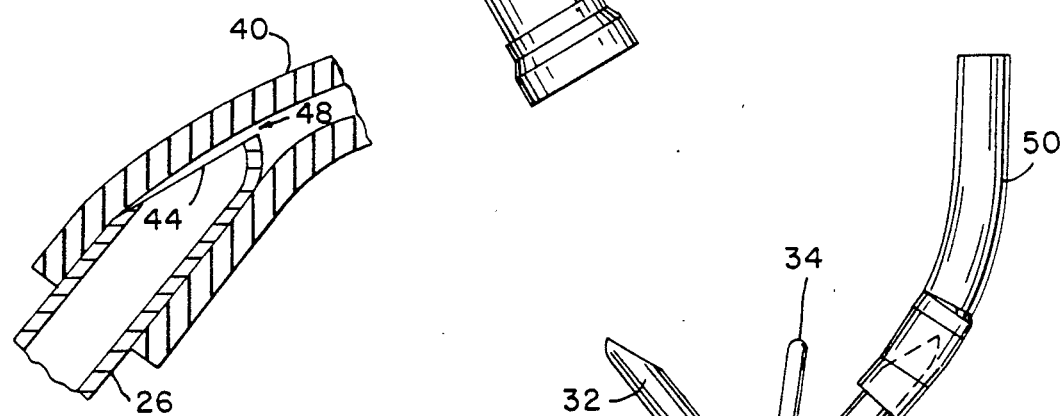
FIG. 6
PRIOR ART
FIG. 7
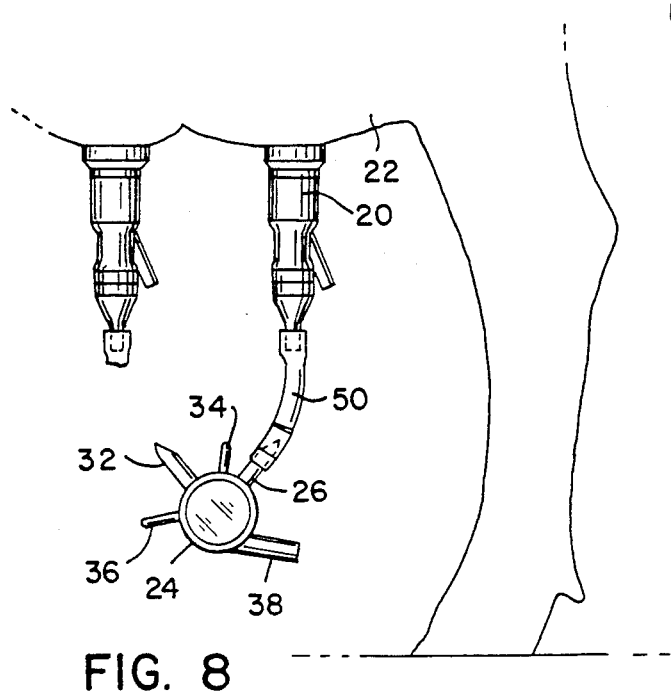
FIG. 8
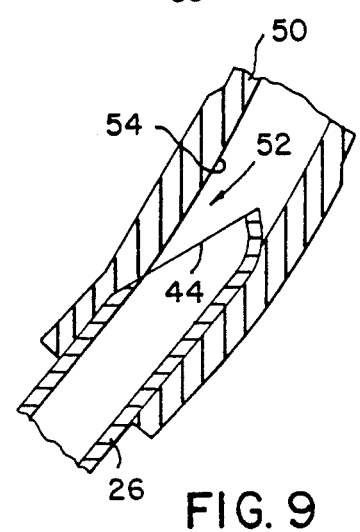
FIG. 9

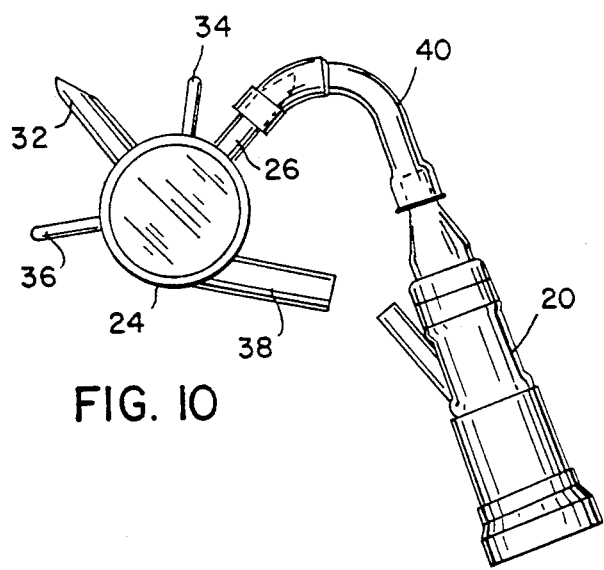
FIG. 10
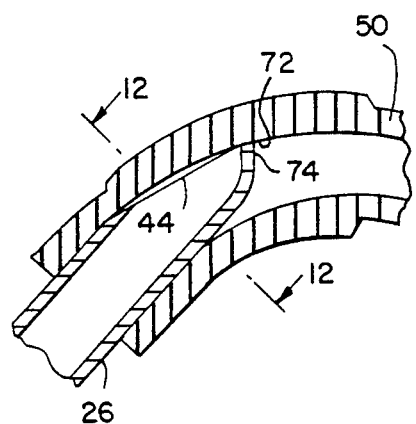
FIG. 11
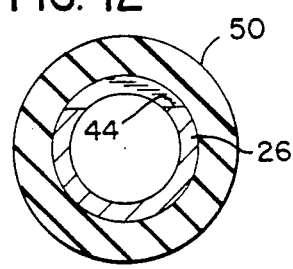
FIG. 12
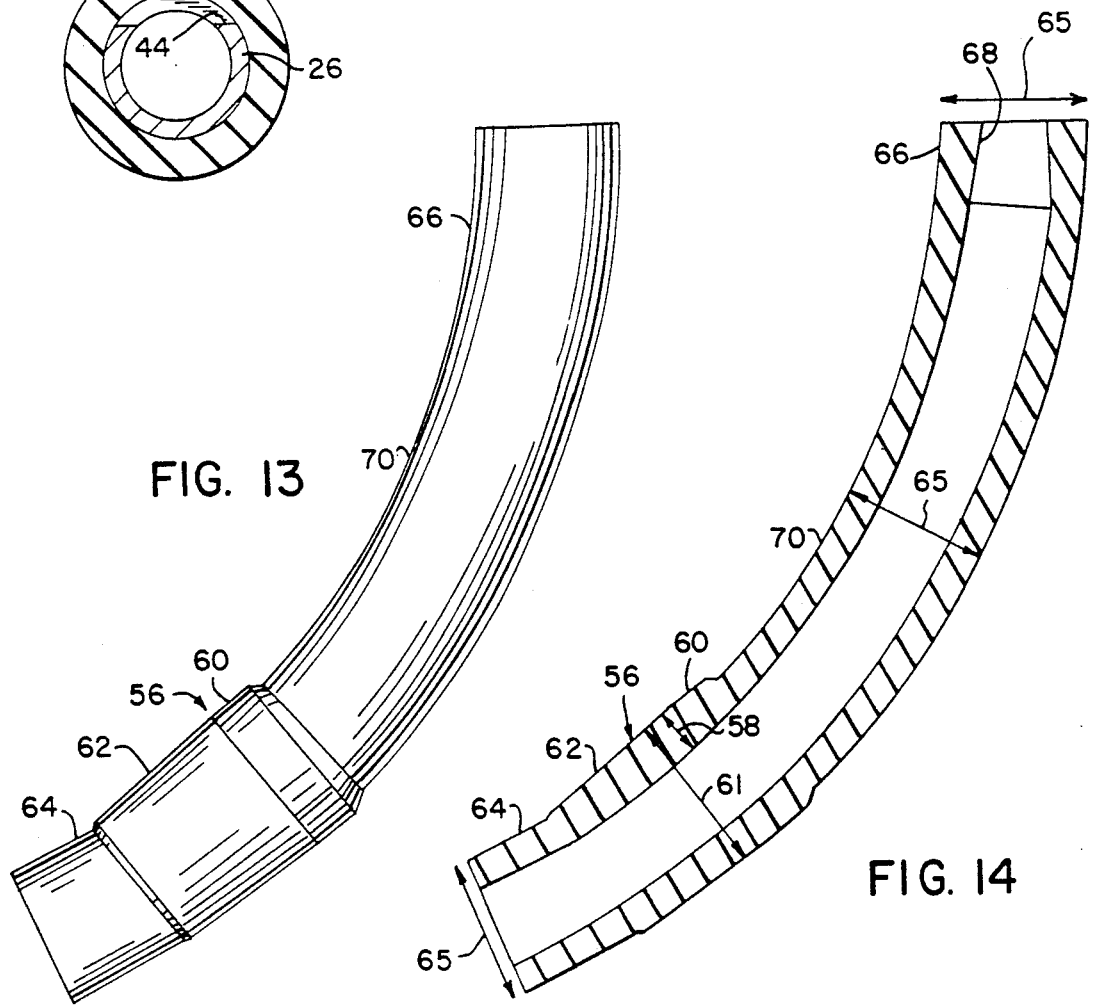
FIG. 13
FIG. 14

1

PRE-CURVED MILK TUBE

BACKGROUND AND SUMMARY

The invention relates to milking apparatus, and more particularly to an improved milk tube connected between a milking claw and a teat cup.

Milking apparatus known in the prior art includes a plurality of teat cups connected to the cow, a milking claw having a plurality of inlets and having a discharge outlet through which the milk is suctioned, and a plurality of flexible milk tubes each connected between a respective teat cup and claw inlet. The milk tube is straight before connection to the claw inlet and the teat cup, and upon such connection curves outwardly and upwardly from the claw inlet to the teat cup which is mounted on the cow's teat.

The present invention involves recognition of a source of unnecessary flow restriction in the milk tube. Upon connection between the claw inlet and the teat cup, the milk tube is stressed to curve outwardly and upwardly from the claw inlet to the teat cup. It has been found that the noted stressing of the milk tube tends to deform the tube toward the claw inlet opening to reduce the inner cross sectional area of the tube and decrease the inner clearance between the tube and the claw inlet opening, which restricts flow. It has also been found that in the non-milking position with the teat cup hanging downwardly, the tube does not provide as good a shut-off seal against the claw inlet as desired.

The present invention provides simple structure recognizing the cause of the above noted problems and effectively solving same. The present invention provides a pre-curved milk tube which is not stressed in the milking position and instead retains its full circular size in the inlet area, which provides less restriction to flow. In the non-milking position with the teat cup hanging downwardly, the pre-curved milk tube has to rotate through a greater range from its unstressed upwardly curved position to the downward non-milking position, which provides a better shut-off seal than a straight tube.

BRIEF DESCRIPTION OF THE DRAWINGS

Prior Art

FIG. 5 is a side view of milking apparatus in a non-milking position as known in the prior art.

FIG. 6 is an enlarged view of a portion of the structure in FIG. 5.

Present Invention

Figure 2:
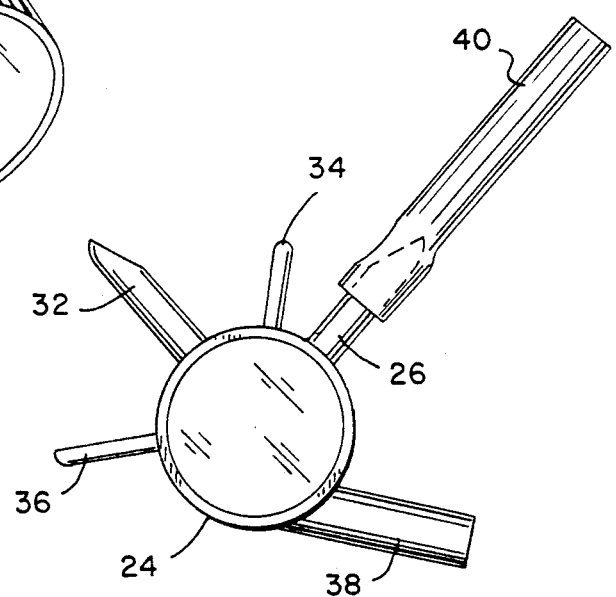
FIG. 2 is a side view of a milking claw and milk tube known in the prior art.

FIG. 7 is a view like FIG. 2 and shows the present invention.

Figure 3:
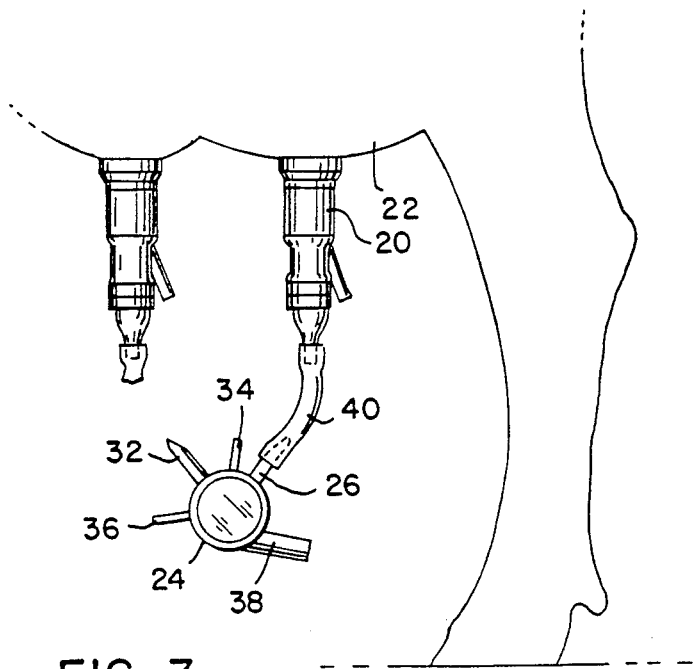
FIG. 3 is a side view of milking apparatus known in the prior art.

FIG. 8 is a view like FIG. 3 and shows the present invention.

Figure 4:
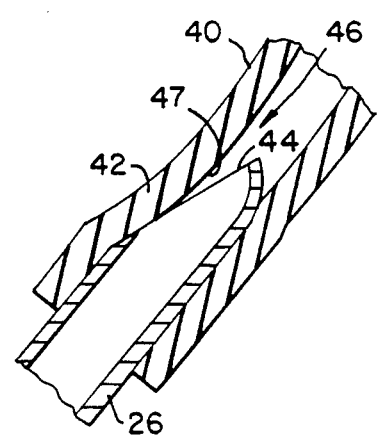
FIG. 4 is an enlarged sectional view of a portion of the structure in FIGS. 2 and 3.

FIG. 9 is a view like FIG. 4 and shows the present invention.

FIG. 10 is a view like FIG. 5 and shows the present invention.

FIG. 11 is a view like FIG. 6 and shows the present invention.

FIG. 12 is a sectional view taken along line 12—12 of FIG. 11.

FIG. 13 is a side elevation view of a precurved milk tube in accordance with the invention.

FIG. 14 is a sectional view of the structure of FIG. 13.

DETAILED DESCRIPTION

Prior Art

Figure 1:
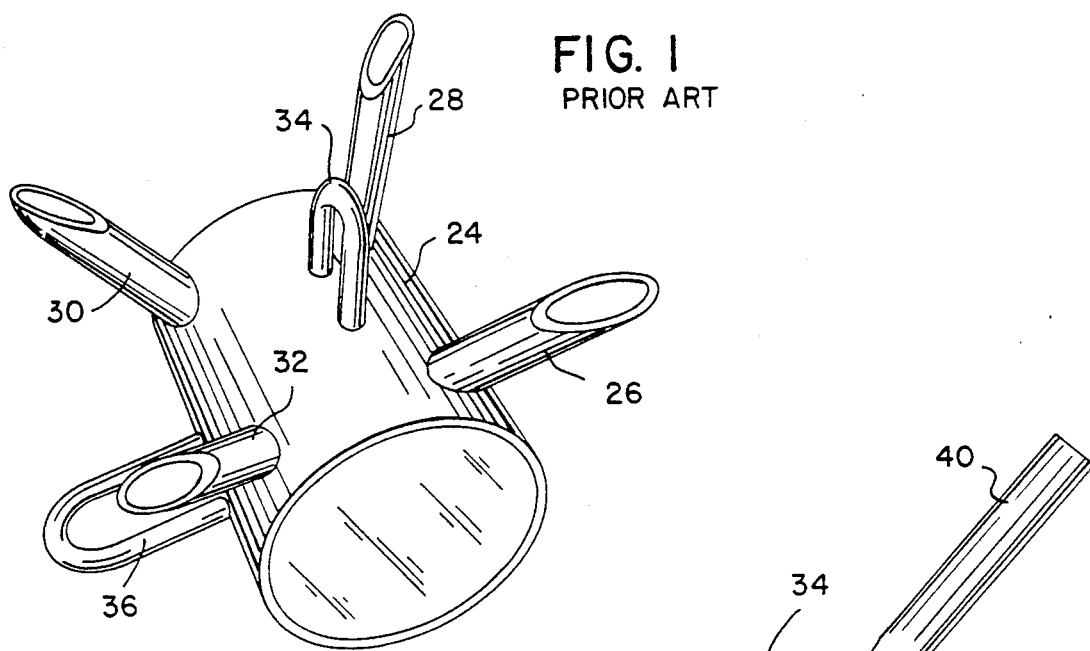
FIG. 1 is a perspective view of a milking claw known in the prior art.

FIGS. 1-3 show milking apparatus known in the prior art, including a teat cup 20 for connection to a cow 22, a milking claw 24 having a plurality of inlets 26, 28, 30, 32, and attachment or hanging hooks 34, 36, and having a discharge outlet 38 for connection to a source of suction (not shown), and a flexible milk tube 40 connected between a respective teat cup 20 and a respective claw inlet 26, all as known in the art, for example U.S. Pat. Nos. 2,518,589, 3,150,637, 4,253,419, 4,324,201, 4,537,152, 4,745,881, 4,756,275, 4,869,205, incorporated herein by reference.

Milk tube 40 is a resilient flexible member, typically rubber, which is straight before connection between claw inlet 26 and teat cup 20, and upon such connection curves outwardly and upwardly from claw inlet 26 to teat cup 20. It has been found that this connection stresses tube 40 and that such stress tends to deform the tube at portion 42, FIG. 4, against the claw inlet and downwardly toward upwardly facing beveled claw inlet opening 44 to reduce the inner cross sectional area of tube 40 and decrease the clearance 46 between inner surface 47 of tube 40 and claw inlet 26 at beveled opening 44, and thus restrict milk and air flow.

FIG. 3 shows the milking position of the apparatus with teat cup 20 above claw inlet 26. FIG. 5 shows the non-milking position with teat cup 20 below claw inlet 26, and with tube 40 bent downwardly, opposite to the upward curving of FIG. 3, and shutting off claw inlet 26 to prevent flow therethrough. It has been found that the shut-off at beveled opening 44 is not always complete, and that there may remain a small gap as shown at 48 in FIG. 6.

Present Invention

FIGS. 7-14 show the present invention and use like reference numerals from FIGS. 1-6 where appropriate to facilitate understanding.

A flexible milk tube 50 is connected between teat cup 20 and claw inlet 26. Tube 50 is a formed pre-curved resilient member, preferably rubber, having an unstressed position extending outwardly from claw inlet 26 and curved upwardly to teat cup 20. Tube 50 also curves upwardly when non-connected to the teat cup, FIG. 13, such that tube 50 normally and naturally extends outwardly and upwardly from claw inlet 26. The pre-curvature and natural upward curving of tube 50 minimize stress in the tube when connected between claw inlet 26 and teat cup 20, in contrast to the stress created in straight tube 40 upon such connection. As noted above, the stress in tube 40 tends to deform the tube at portion 42 adjacent claw inlet 26 to reduce the inner cross sectional area of the tube and restrict flow. Pre-curved tube 50 maintains increased clearance, as shown at 52, FIG. 9, between the inner surface 54 of tube 50 and beveled claw inlet opening 44. As seen by comparing FIGS. 9 and 4, clearance 52 is greater than clearance 46. The increased clearance 52 maximizes the inner cross sectional area of tube 50 and provides less restriction to flow.

Pre-curved tube 50 has a humped outer configuration 56, FIG. 13 and 14, providing increased sidewall thickness 58 of tube 50 adjacent claw inlet 26 to further resist deformation of the tube which would otherwise restrict flow. Humped outer configuration 56 includes a circumferential shoulder portion 60 extending radially outwardly to an extended outer diameter 61, and a tapered portion 62 tapered along the tube and of decreasing outer diameter as tapered portion 62 tapers away from shoulder portion 60. Shoulder portion 60 is axially spaced from claw inlet 26, and tapered portion 62 overlaps claw inlet 26 at opening 44. Tube 50 has one end portion 64 of an outer diameter 65 prior to connection, which diameter increases when connected to claw inlet 26, as the rubber material of the tube stretches to fit around the claw inlet. Tapered portion 62 tapers away from end portion 64, and shoulder portion 60 has the noted extended outer diameter 61 greater than the noted pre-connected outer diameter 65 of end portion 64. Tube 50 has another end portion 66 distally opposite end portion 64 and having outer diameter 65 prior to connection to teat cup 20, which diameter increases when connected to teat cup 20, as the rubber material of the tube stretches to fit around the teat cup. End portion 66 has an inner wall 68, FIG. 14, of reduced diameter to better fit the teat cup. Tube 50 has a central portion 70 between shoulder portion 60 and end portion 66 and of a constant outer diameter 65 equal to the outer diameter of end portions 64 and 66 prior to the noted connection. Shoulder portion 60 is substantially closer to end portion 64 then to end portion 66. The combined length of central portion 70 and end portion 66 is substantially longer than the combined length of end portion 64, tapered portion 62 and shoulder portion 60.

The milking apparatus has a milking position as shown in FIG. 8 with teat cup 20 above claw inlet 26. The milking apparatus has a non-milking position as shown in FIG. 10 with teat cup 20 below claw inlet 26 and with tube 50 bent downwardly by gravity, opposite to the upward curving of FIG. 8, and shutting off claw inlet 26 at beveled inlet opening 44 to prevent flow therethrough, FIG. 11. The rotation of pre-curved tube 50 from its unstressed position to the downward non-milking position provides a greater range of motion than a straight tube, which greater range of motion creates more deformation of the tube in the downward shut-off position, effecting a better shut-off seal. The inner surface 72, FIG. 11, of tube 50 is bent downwardly over and engages outer tip 74 of beveled inlet opening 44 to provide the seal.

It is recognized that various equivalents, alternatives and modifications are possible within the scope of the appended claims.

I claim:
1. Milking apparatus comprising:
a teat cup;
a milking claw having a plurality of inlets and having a discharge outlet;
a flexible milk tube connected between said teat cup and a respective claw inlet, said tube being a formed pre-curved member extending outwardly from said claw inlet and curved upwardly to said teat cup, and wherein said tube also curves upwardly when non-connected to said teat cup, such that said tube normally and naturally extends outwardly and upwardly from said claw inlet to minimize stress otherwise occurring in a straight tube which is curved upwardly from said claw inlet, which stress tends to deform the tube adjacent said claw inlet to reduce the inner cross sectional area of the tube and restrict flow.

2. The invention according to claim 1 wherein said claw inlet is beveled to form an upwardly facing opening, and wherein said stressing of said straight tube decreases the inner clearance between said straight tube and said beveled claw inlet opening, and wherein said pre-curved tube maintains increased clearance between said pre-curved tube and said beveled claw inlet opening to maximize the inner cross sectional area of the tube and provide less restriction to flow.

3. The invention according to claim 1 wherein said pre-curved tube has a humped outer configuration adjacent said claw inlet providing increased sidewall thickness of said pre-curved tube adjacent said claw inlet to further resist deformation of the tube which would otherwise restrict flow.

4. The invention according to claim 1 wherein said humped outer configuration comprises a circumferential shoulder portion extending radially outwardly to an extended outer diameter, and a tapered portion tapered along the tube and of decreasing outer diameter as said tapered portion tapers away from said shoulder portion.

5. The invention according to claim 4 wherein said shoulder portion is axially spaced from said claw inlet, and said tapered portion overlaps said claw inlet.

6. Milking apparatus comprising:
a teat cup;
a milking claw having a plurality of inlets and having a discharge outlet;
a flexible milk tube connected between said teat cup and a respective claw inlet, said tube being a formed pre-curved member having an unstressed position extending outwardly from said claw inlet and curved upwardly to said teat cup, and wherein said tube also curves upwardly when non-connected to said teat cup, such that said tube normally and naturally extends outwardly and upwardly from said claw inlet,
said apparatus having a milking position with said teat cup above said claw inlet,
said apparatus having a non-milking position with said teat cup below said claw inlet and said tube bent downwardly, opposite to said upward curving, and shutting off said claw inlet to prevent flow there-through, the rotation of said pre-curved tube from its unstressed position to the downward non-milking position providing a greater range of motion than a straight tube, which greater range of motion creates more deformation of the tube in the downward shut-off position, effecting a better shut-off seal.

7. In milking apparatus having a teat cup, a milking claw having a plurality of inlets and having a discharge outlet, and a flexible mil tube connected between said teat cup and a respective claw inlet, an improved milk tube comprising a formed pre-curved member having an unstressed position extending outwardly from said claw inlet and curved upwardly to said teat cup, said pre-curved tube also curving upwardly when non-connected to said teat cup, such that said pre-curved tube normally and naturally extends outwardly and upwardly from said claw inlet to minimize stress otherwise occurring in a straight tube, such that said precurved tube maintains increased clearance between said pre-curved tube and said claw inlet opening to maximize the inner cross sectional area of the tube and create less restriction to flow.

8. The invention according to claim 7 wherein said apparatus has a milking position with said teat cup above said claw inlet, and has a non-milking position with said teat cup below said claw inlet and said tube bent downwardly, opposite to said upward curving, and shutting off said claw inlet to prevent flow therethrough, the rotation of said pre-curved tube from its unstressed position to the downward non-milking position providing a greater range of motion than a straight tube, which greater range of motion creates more deformation of the tube in the downward shut-off position, effecting a better shut-off seal.

9. The invention according to claim 8 wherein said pre-curved tube has a humped outer configuration adjacent said claw inlet providing increased sidewall thickness of said pre-curved tube adjacent said claw inlet to further resist deformation of the tube which would otherwise restrict flow.

10. The invention according to claim 7 wherein said pre-curved tube has an outer configuration comprising a circumferential shoulder portion extending radially outwardly to an extended outer diameter, and a tapered portion tapered along said pre-curved tube and of decreasing outer diameter as said tapered portion tapers away from said shoulder portion.

11. The invention according to claim 10 wherein said shoulder portion is axially spaced from said claw inlet, and said tapered portion overlaps said claw inlet.

12. In milking apparatus having a teat cup, a milking claw having a plurality of inlets and having a discharge outlet, and a flexible milk tube connected between said teat cup and a respective claw inlet, an improved milk tube comprising a formed pre-curved member connected between said claw inlet and said teat cup and curved both before and after connection to said teat cup, said pre-curved milk tube having a first end portion of a given outer diameter prior to said connection, said pre-curved milk tube having a tapered portion tapered along the tube from said first end portion and of increasing outer diameter as said tapered portion tapers away from said first end portion, said pre-curved milk tube having a shoulder portion extending along the tube from said tapered portion and of extended outer diameter greater than said given outer diameter, said pre-curved milk tube having a second end portion distally opposite said first end portion and having an outer diameter prior to said connection less than said extended outer diameter of said shoulder portion.

13. The invention according to claim 12 wherein said pre-curved milk tube has a central portion between said shoulder portion and said second end portion and having an outer diameter less than said extended outer diameter of said shoulder portion.

14. The invention according to claim 13 wherein said outer diameter of said second end portion is equal to said given outer diameter of said first end portion prior to said connection.

15. The invention according to claim 14 wherein said central portion of said tube has a constant outer diameter equal to said given outer diameter of both said first end portion and said second end portion prior to said connection.

16. The invention according to claim 13 wherein said central portion and said second end portion have a combined length substantially longer than the combined length of said first end portion, said tapered portion, and said shoulder portion.

17. The invention according to claim 12 wherein said first end portion is connected to said claw inlet, said second end portion is connected to said teat cup, and said shoulder portion is substantially closer to said first end portion than to said second end portion.

* * * * *